(12) United States Patent
Swanson (10) Patent No.: US 6,945,744 B1
(45) Date of Patent: Sep. 20, 2005

(54) TRAILER BED SYSTEM

(76) Inventor: George A. Swanson, P.O. Box 166, Cummings, ND (US) 58223

( * ) Notice: Subject to any disclaimer, the term of this patent is extended or adjusted under 35 U.S.C. 154(b) by 0 days.

(21) Appl. No.: 10/388,136

(22) Filed: Mar. 12, 2003

(51) Int. Cl.⁷ .............................................. B60P 1/02
(52) U.S. Cl. ...................................................... 414/482
(58) Field of Search ............................... 414/481, 482, 414/483, 484, 485, 459; 280/43.11

(56) References Cited

U.S. PATENT DOCUMENTS

| | | | |
|---|---|---|---|
| 3,065,871 A | 11/1962 | Schramm | 214/506 |
| 3,361,440 A | 1/1968 | Green | 280/43.18 |
| 3,788,675 A * | 1/1974 | Wilander | 280/43.11 |
| 4,077,643 A | 3/1978 | Bates | 280/43.18 |
| 4,154,352 A | 5/1979 | Fowler | 414/495 |
| 4,490,089 A | 12/1984 | Welker | 414/483 |
| 4,673,328 A | 6/1987 | Shiels | 414/471 |
| 5,308,213 A | 5/1994 | Gilbertson | 414/482 |
| 5,474,416 A | 12/1995 | Rogge et al. | 419/482 |
| 5,649,802 A | 7/1997 | Babcock | 414/483 |
| 5,810,544 A | 9/1998 | Wellman | 414/495 |
| 6,273,435 B1 | 8/2001 | Stringer | 280/6.151 |

* cited by examiner

Primary Examiner—Eileen D. Lillis
Assistant Examiner—Charles A. Fox (57) ABSTRACT

A trailer bed system for loading/unloading a trailer without the usage of ramps. The trailer bed system includes a main frame with a plurality of supporting wheels, a deck frame pivotally attached to the main frame, and a front hitch structure pivotally attached to the deck frame. An actuator unit is attached to the front hitch structure and manipulates a length of cable that is attached to a pulley system thereby allowing for the control of the height of the deck frame.

20 Claims, 7 Drawing Sheets

TRAILER BED SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to trailers for vehicles and more specifically it relates to a trailer bed system for loading/unloading a trailer without the usage of ramps.

2. Description of the Related Art

Trailers have been in use for years. A conventional trailer is comprised of a rigid frame structure, a plurality of wheels supporting the frame structure a finite distance above the ground surface (e.g. 1 to 3 feet), and a hitch attached to the frame structure for removably attaching to a vehicle.

The main problem with conventional trailers is that when loading/unloading cargo, the user has to utilize ramps which are cumbersome and difficult to store during non-usage. A further problem with conventional trailers is that users will often times simply attempt to manually lift the cargo onto the trailer without using ramps which can result in physical injury to the user.

Examples of patented devices which may be related to the present invention include U.S. Pat. No. 5,649,802 to Babcock; U.S. Pat. No. 5,810,544 to Wellman; U.S. Pat. No. 5,308,213 to Gilbertson; U.S. Pat. No. 4,490,089 to Welker; U.S. Pat. No. 3,065,871 to Schramm; U.S. Pat. No. 4,673,328 to Shiels; U.S. Pat. No. 5,474,416 to Rogge et al.; U.S. Pat. No. 4,077,643 to Bates; U.S. Pat. No. 6,273,435 to Stringer; U.S. Pat. No. 3,361,440 to Green; and U.S. Pat. No. 4,154,352 to Fowler.

While these devices may be suitable for the particular purpose to which they address, they are not as suitable for loading/unloading a trailer without the usage of ramps. Conventional trailers are not convenient to utilize for loading/unloading cargo.

In these respects, the trailer bed system according to the present invention substantially departs from the conventional concepts and designs of the prior art, and in so doing provides an apparatus primarily developed for the purpose of loading/unloading a trailer without the usage of ramps.

BRIEF SUMMARY OF THE INVENTION

In view of the foregoing disadvantages inherent in the known types of trailers now present in the prior art, the present invention provides a new trailer bed system construction wherein the same can be utilized for loading/unloading a trailer without the usage of ramps.

The general purpose of the present invention, which will be described subsequently in greater detail, is to provide a new trailer bed system that has many of the advantages of the trailers mentioned heretofore and many novel features that result in a new trailer bed system which is not anticipated, rendered obvious, suggested, or even implied by any of the prior art trailers, either alone or in any combination thereof.

To attain this, the present invention generally comprises a main frame with a plurality of supporting wheels, a deck frame pivotally attached to the main frame, and a front hitch structure pivotally attached to the deck frame. An actuator unit is attached to the front hitch structure and manipulates a length of cable that is attached to a pulley system thereby allowing for the control of the height of the deck frame.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a trailer bed system that will overcome the shortcomings of the prior art devices.

A second object is to provide a trailer bed system for loading/unloading a trailer without the usage of ramps.

Another object is to provide a trailer bed system that lowers the trailer deck to a level almost flush to the ground surface.

An additional object is to provide a trailer bed system that eliminates the need for ramps or manually elevating cargo.

A further object is to provide a trailer bed system that may be utilized for supporting various types and sizes of cargo such as but not limited to vehicles, golf carts, lawn mowers, motorcycles, furniture and ice-houses for fishing.

Another object is to provide a trailer bed system that the user can directly access without having to climb onto the deck.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Turning now descriptively to the drawings, in which similar reference characters denote similar elements throughout the several views, FIGS. 1 through 7 illustrate a trailer bed system 10, which comprises a main frame 20 with a plurality of supporting wheels 22, a deck frame 30 pivotally attached to the main frame 20, and a front hitch structure 52 pivotally attached to the deck frame 30. An actuator unit 40 is attached to the front hitch structure 52 and manipulates a length of cable 42 that is attached to a pulley system thereby allowing for the control of the height of the deck frame 30.

Figure 1:
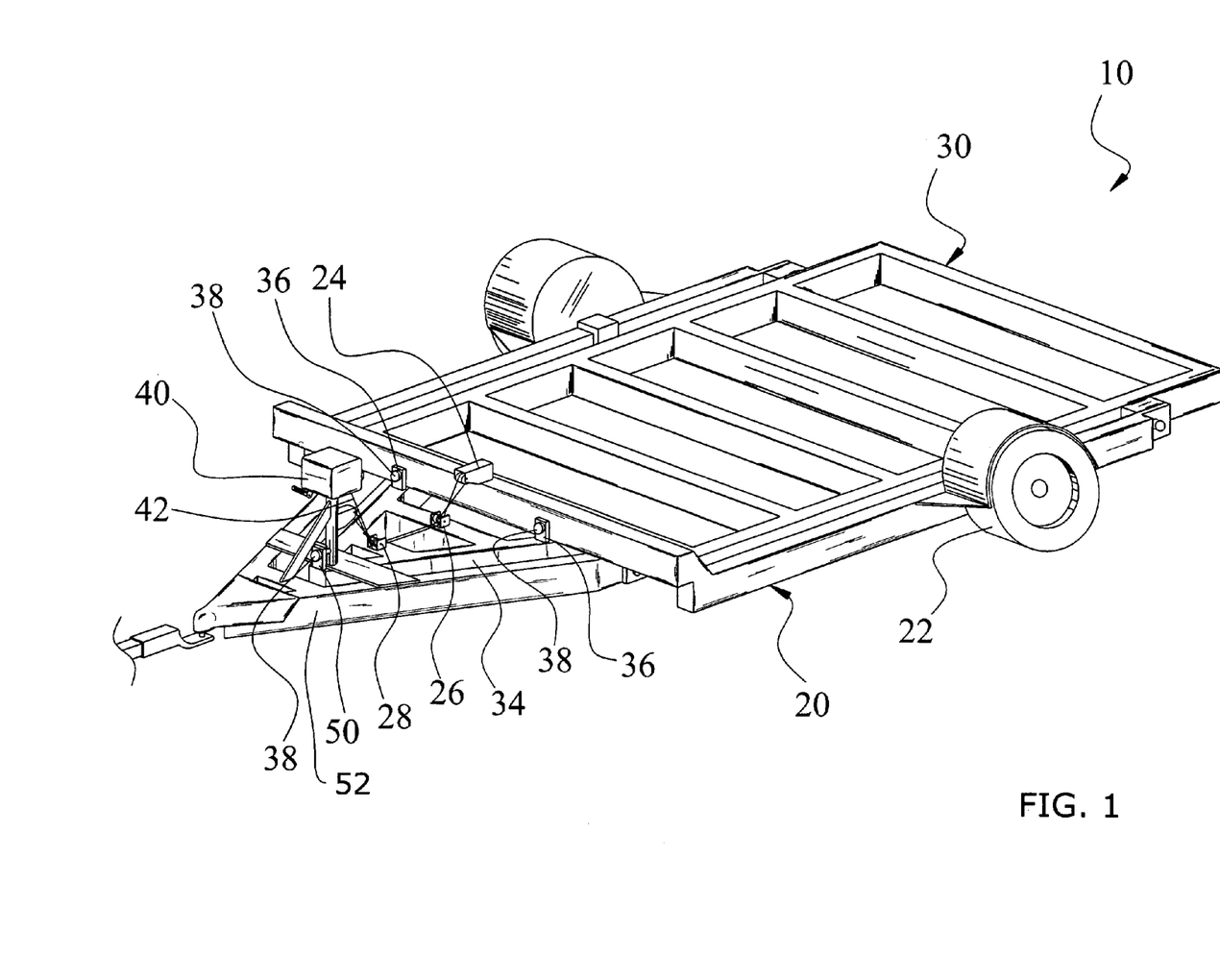
FIG. 1 is a front upper perspective view of the present invention in the raised position.
Figure 2:
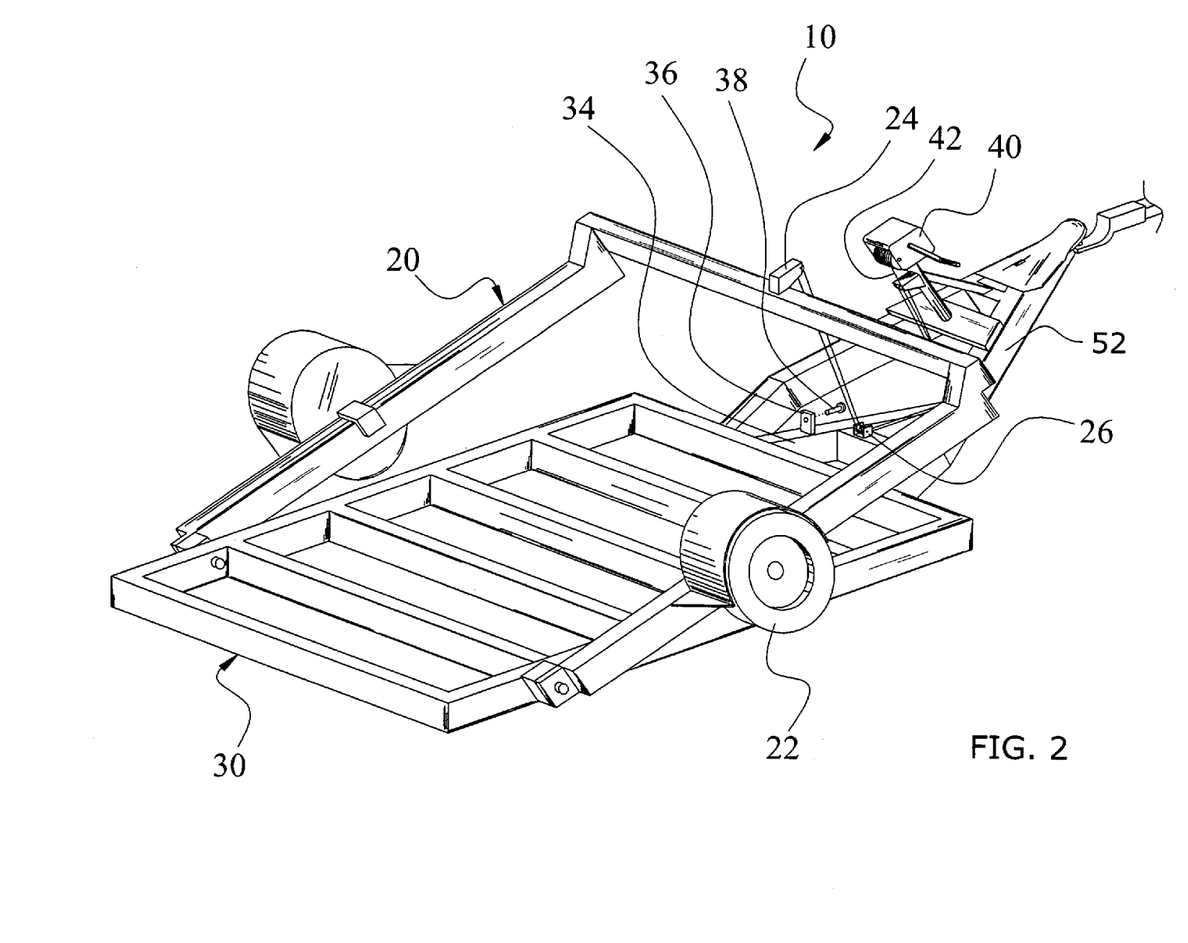
FIG. 2 is a rear upper perspective view of the present invention in the lowered position.

As best illustrated in FIG. 2 of the drawings, the main frame 20 preferably has an open U-shaped structure for movably receiving and supporting the deck frame 30. The main frame 20 has a plurality of wheels 22 rotatably attached for supporting the main frame 20 a finite distance above the ground surface. The wheels 22 are preferably located in a central location of the main frame 20 for allowing the main frame 20 to pivot about the wheels 22. As shown in FIGS. 1 and 2 of the drawings, a pair of wheels 22 are preferably attached to opposing sides of the main frame 20 to achieve the desired pivot point. Various other structures may be utilized to construct the main frame 20.

Figure 4:
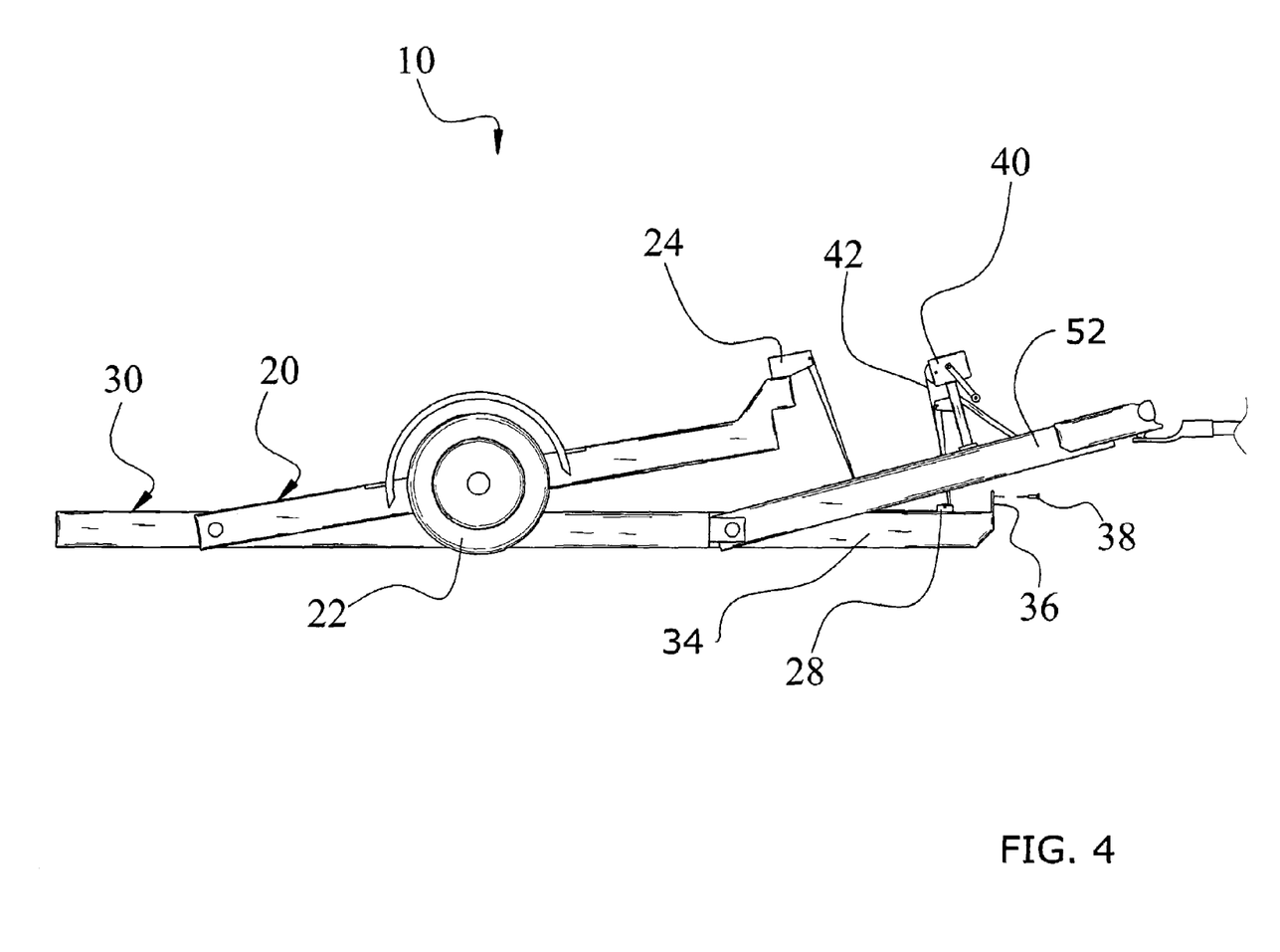
FIG. 4 is a side view of the present invention in the lowered position.

As best illustrated in FIGS. 2 and 4 of the drawings, a rear portion of the deck frame 30 is pivotally attached to a rear portion of the main frame 20. The deck frame 30 is smaller in size than the main frame 20 so that the deck frame 30 is freely movable within the main frame 20. The deck frame 30 is comprised of a generally flat rigid structure with a deck support 32 for supporting the cargo. The rear edge of the deck frame 30 may be tapered for facilitating the loading/unloading of the cargo onto the deck support 32.

Figure 3:
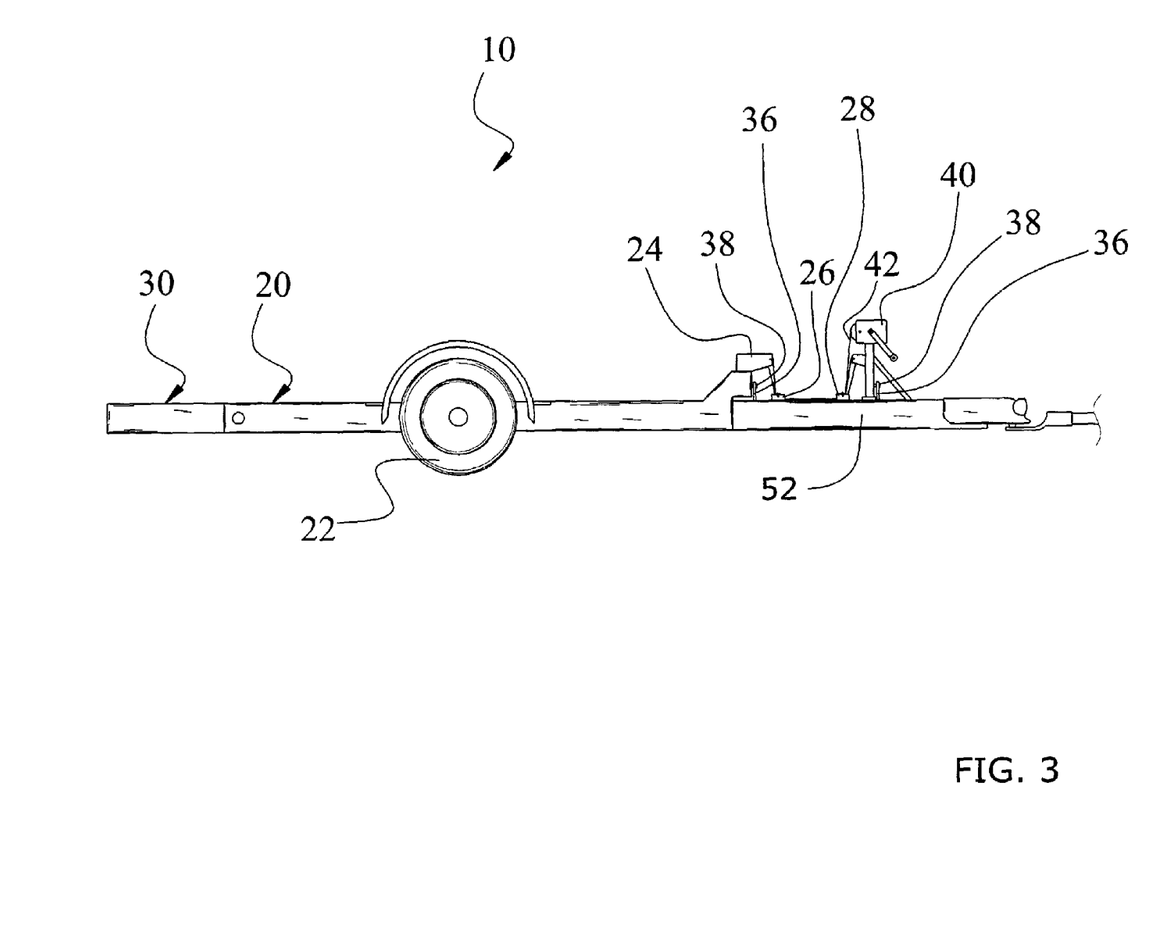
FIG. 3 is a side view of the present invention in the raised position.
Figure 5:
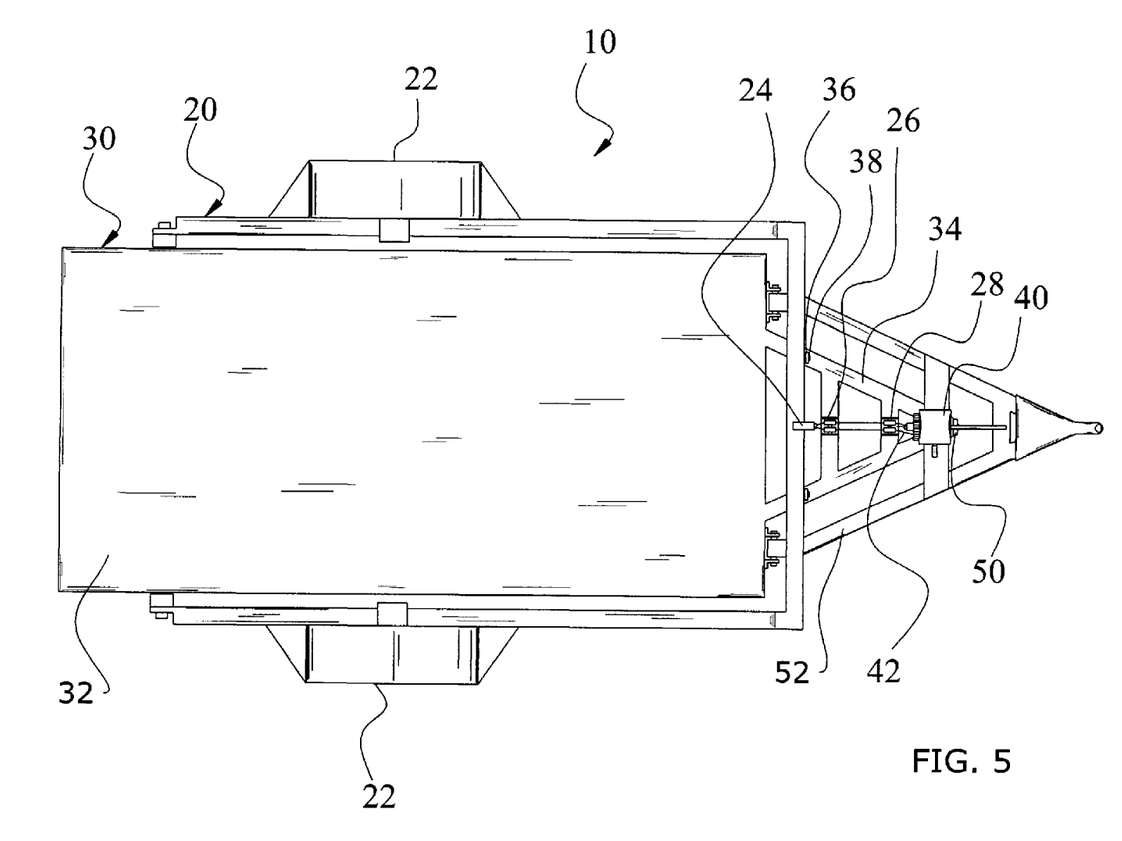
FIG. 5 is a top view of the present invention.
Figure 6:
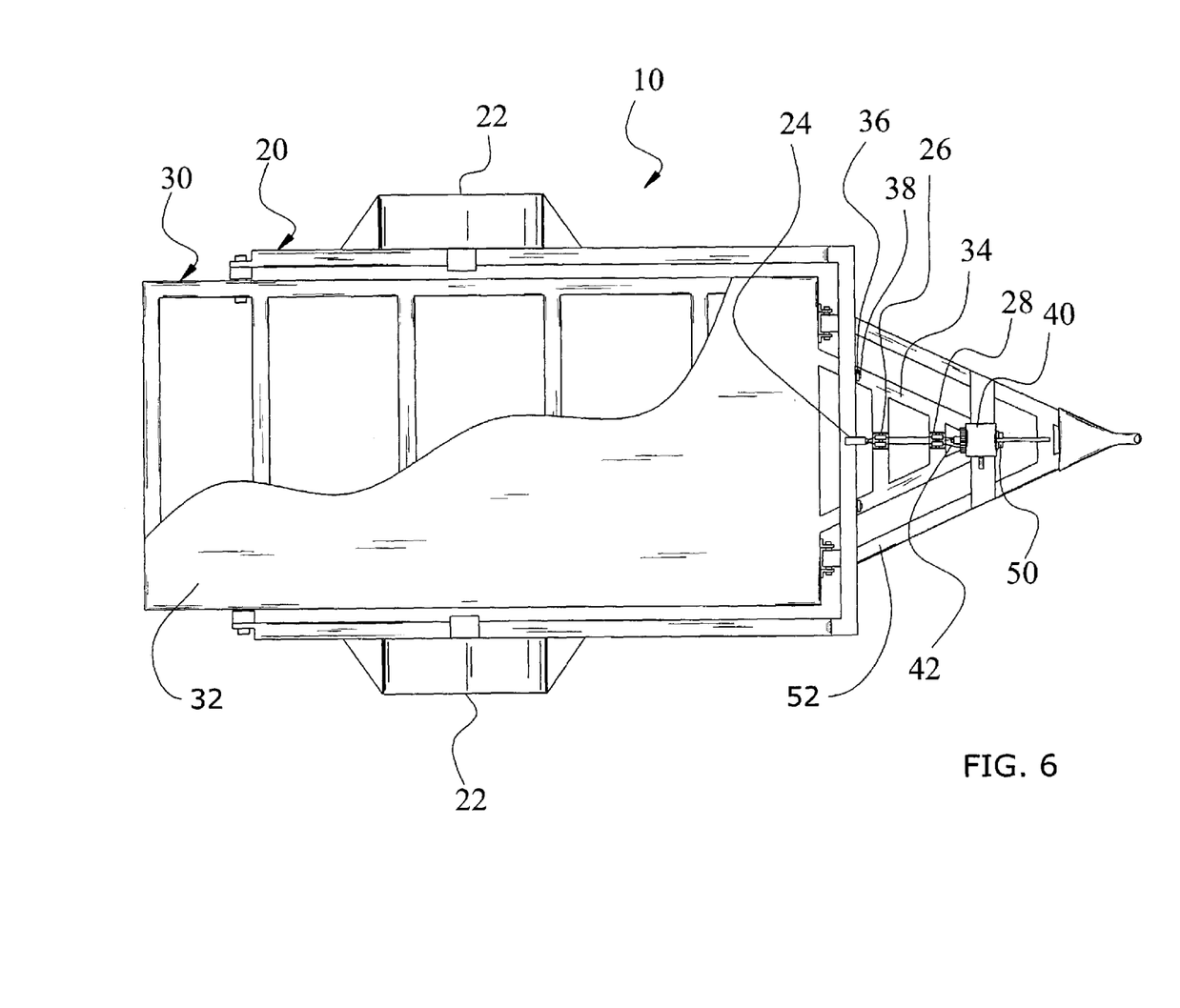
FIG. 6 is a partial top cutaway view of the present invention.
Figure 7:
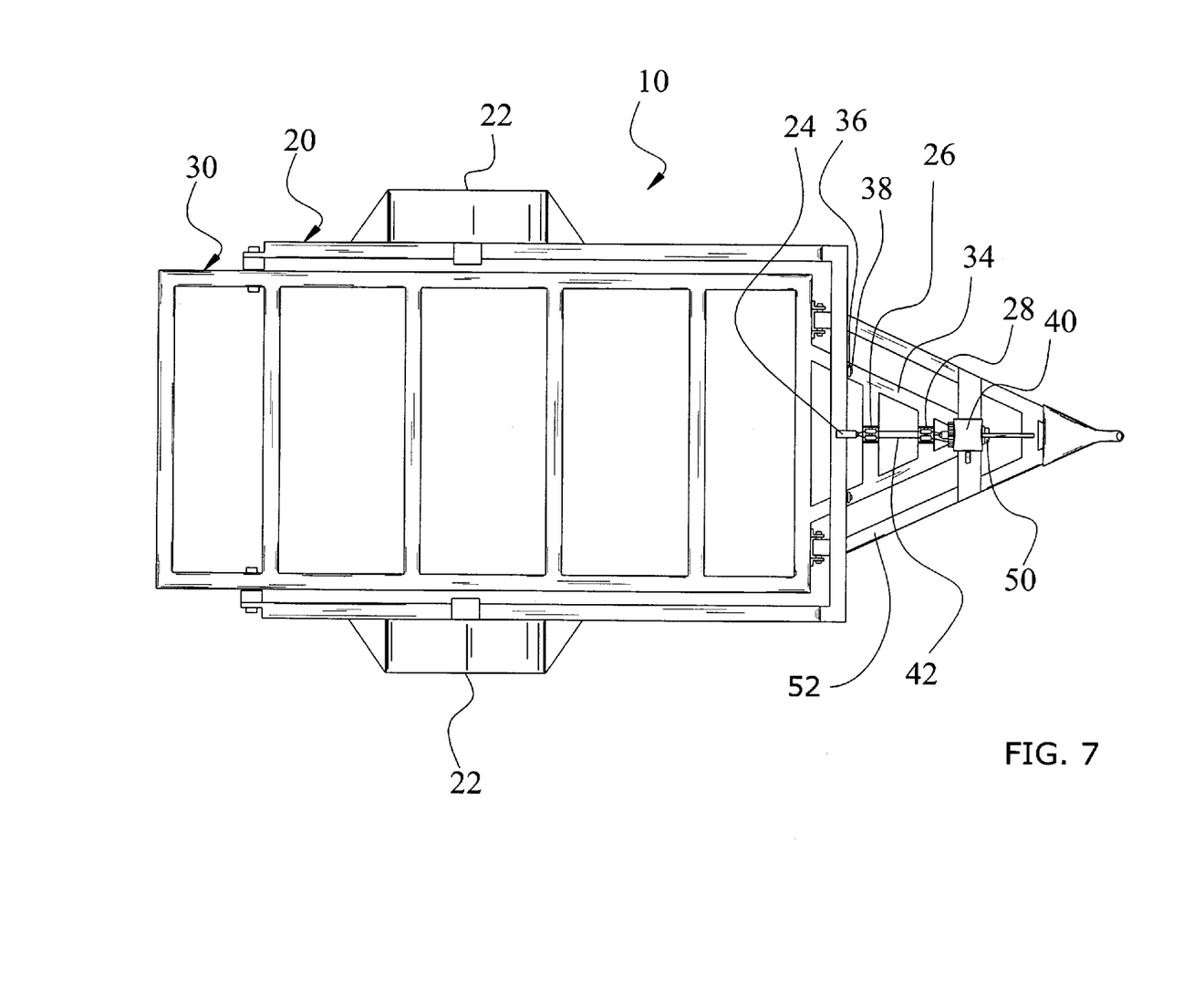
FIG. 7 is a top cutaway view of the present invention.

The deck frame 30 further includes an extended portion 34 that extends forwardly beneath the enclosed front of the main frame 20 as best illustrated in FIGS. 5 through 7 of the drawings. One or more locking brackets 36 attached to the extended portion 34 receive locking pins 38 that are selectively inserted into the main frame 20 thereby allowing the user to lock the deck frame 30 and the main frame 20 in a substantially parallel structure as shown in FIGS. 1 and 3 of the drawings.

A front hitch structure 52 is pivotally attached to a front portion of the deck frame 30 as best illustrated in FIGS. 4 through 7 of the drawings. The front hitch structure 52 is selectively connectable to a hitch structure of a vehicle such as a ball coupler as shown in FIG. 4 of the drawings. A front bracket 50 is attached to the front hitch structure 52 for selectively receiving a locking pin 38 that is insertable into the deck frame 30 for locking the front hitch structure 52 and the deck frame 30 in a substantially parallel structure.

An actuator unit 40 is attached to the front hitch structure 52 as shown in FIGS. 1 through 7 of the drawings. The actuator unit 40 is cable 42 of receiving, storing and dispensing a length of cable 42 or other suitable elongate flexible member. The actuator unit 40 may be electrically, hydraulically or manually powered for controlling the movement of the length of the cable 42.

A first pulley unit 24 is attached to the front of the main frame 20 as shown in FIG. 1 of the drawings. A second pulley unit 26 is attached to a rear portion of the extended portion 34 of the deck frame 30 as shown in FIG. 1 of the drawings. A third pulley unit 28 is attached to a front portion of the extended portion 34 of the deck frame 30 as shown in FIG. 1 of the drawings. The length of cable 42 extends downwardly from the actuator unit 40 to the third pulley unit 28 then horizontally to the second pulley unit 26 and then vertically to the first pulley unit 24 as best illustrated in FIG. 4 of the drawings. The cable 42 is then returned through the second pulley unit 26 and the third pulley unit 28 where the cable 42 is secured either to the front hitch structure 52 or to a bracket extending from the actuator unit 40 as shown in FIG. 4 of the drawings.

In use, the user retains the locking pins 38 within the locking brackets 36 to maintain the raised structure of the trailer bed system 10 as shown in FIGS. 1 and 3 of the drawings. When the user desires to load/unload cargo, the user removes the locking pins 38 and then manipulates the actuator unit 40 to release a length of the cable 42 within. The cable 42 is released thereby allowing the front of the main frame 20 to elevate thereby lowering the rear pivot point of the main frame 20 which lowers the deck frame 30 as best illustrated in FIG. 4 of the drawings. This continues until the deck frame 30 is substantially level with respect to the ground surface. After the cargo has been loaded/unloaded, the user then reverses the process by drawing the cable 42 back into the actuator unit 40 which draws the front of the main frame 20 downwardly while elevating the deck frame 30. Once the deck frame 30 is substantially parallel with respect to the main frame 20 and the front hitch structure 52 as shown in FIG. 3 of the drawings, the user then secures the locking pins 38 within the locking brackets 36. Alternatively, the user may retain the locking pin 38 within the front bracket 50 thereby only allowing the deck frame 30 to tilt instead of completely lowering in a horizontal manner.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer bed system, comprising:
a main frame with a plurality of wheels;
a deck frame pivotally attached to a rear portion of said main frame;
an extended portion extending from a front of said deck frame;

a front hitch structure pivotally attached to a front portion of said deck frame;
a first pulley unit attached to a front end of said main frame;
a second pulley unit attached to a rear section of said extended portion;
a third pulley unit attached to a front section of said extended portion;
an actuator unit attached to said front hitch structure; and
a length of cable extending from said actuator unit through said third pulley unit then through said second pulley unit then through first pulley unit and then returning through said second pulley unit and said third pulley unit to be secured to said front hitch structure.

2. The trailer bed system of claim 1, wherein said main frame has a U-shaped structure.

3. The trailer bed system of claim 2, wherein said deck frame is pivotally attached to a rear end of said main frame.

4. The trailer bed system of claim 1, including a deck support attached to said deck frame.

5. The trailer bed system of claim 1, wherein said wheels are attached to a central portion of said main frame creating a pivot point.

6. The trailer bed system of claim 1, wherein said actuator unit is manually operated.

7. The trailer bed system of claim 1, wherein said actuator unit is powered by a motor.

8. The trailer bed system of claim 1, wherein said deck frame has a rectangular structure.

9. The trailer bed system of claim 1, wherein said extended portion extends below said main frame.

10. The trailer bed system of claim 1, wherein said first pulley unit, said second pulley unit and said third pulley unit are aligned along a longitudinal axis of said main frame.

11. A trailer bed system, comprising:
a main frame with a plurality of wheels;
a deck frame pivotally attached to a rear portion of said main frame;
a deck support attached to said deck frame;
an extended portion extending from a front of said deck frame;
a front hitch structure pivotally attached to a front portion of said deck frame;
a plurality of locking brackets attached to said extended portion;
a plurality of locking pins positionable within said locking brackets for selectively locking the position of the deck frame with respect to said main frame and said front hitch structure;
a first pulley unit attached to a front end of said main frame;
a second pulley unit attached to a rear section of said extended portion;
a third pulley unit attached to a front section of said extended portion;
an actuator unit attached to said front hitch structure; and
a length of cable extending from said actuator unit through said third pulley unit then through said second pulley unit then through first pulley unit and then returning through said second pulley unit and said third pulley unit to be secured to said front hitch structure.

12. The trailer bed system of claim 11, wherein said main frame has a U-shaped structure.

13. The trailer bed system of claim 12, wherein said deck frame is pivotally attached to a rear end of said main frame.

14. The trailer bed system of claim 11, wherein said wheels are attached to a central portion of said main frame creating a pivot point.

15. The trailer bed system of claim 11, wherein said actuator unit is manually operated.

16. The trailer bed system of claim 11, wherein said actuator unit is powered by a motor.

17. The trailer bed system of claim 11, wherein said deck frame has a rectangular structure.

18. The trailer bed system of claim 11, wherein said extended portion extends below said main frame.

19. The trailer bed system of claim 11, wherein said first pulley unit, said second pulley unit and said third pulley unit are aligned along a longitudinal axis of said main frame.

20. A trailer bed system, comprising:
a main frame with a plurality of wheels;
a deck frame pivotally attached to a rear portion of said main frame;
an extended portion extending from a front of said deck frame;
a front hitch structure pivotally attached to a front portion of said deck frame;
a plurality of locking brackets attached to said extended portion;
a plurality of locking pins positionable within said locking brackets for selectively locking the position of the deck frame with respect to said main frame and said front hitch structure;
a first pulley unit attached to a front end of said main frame;
a second pulley unit attached to a rear section of said extended portion;
a third pulley unit attached to a front section of said extended portion;
an actuator unit attached to said front hitch structure;
a length of cable extending from said actuator unit through said third pulley unit then through said second pulley unit then through first pulley unit and then returning through said second pulley unit and said third pulley unit to be secured to said front hitch structure;
wherein said main frame has a U-shaped structure;
wherein said deck frame is pivotally attached to a rear end of said main frame;
a deck support attached to said deck frame;
wherein said wheels are attached to a central portion of said main frame creating a pivot point;
wherein said actuator unit is powered by a motor;
wherein said deck frame has a rectangular structure;
wherein said extended portion extends below said main frame; and
wherein said first pulley unit, said second pulley unit and said third pulley unit are aligned along a longitudinal axis of said main frame.

* * * * *